(12) United States Patent
Matich et al.

(10) Patent No.: US 7,259,713 B1
(45) Date of Patent: Aug. 21, 2007

(54) RANGING SYSTEMS

(75) Inventors: George Edward Matich, Basildon (GB); David Henry Ramsey, Pitsea (GB); Raymond John Walls, Chelmsford (GB)

(73) Assignee: Selex Sensors and Airborne Systems Limited, Basildon, Essex (GB)

( * ) Notice: Subject to any disclaimer, the term of this patent is extended or adjusted under 35 U.S.C. 154(b) by 0 days.

(21) Appl. No.: 07/578,515

(22) Filed: Aug. 16, 1990

(51) Int. Cl.
*G01S 13/18* (2006.01)

(52) U.S. Cl. ............... 342/145; 342/120; 342/122; 342/136

(58) Field of Classification Search ............ 342/145, 342/136, 120, 122, 202, 189
See application file for complete search history.

(56) References Cited

U.S. PATENT DOCUMENTS

| | | | | |
|---|---|---|---|---|
| 3,659,292 A | * | 4/1972 | Low et al. ............. | 342/98 |
| 3,680,100 A | * | 7/1972 | Woerrlein ............. | 342/13 |
| 3,801,982 A | * | 4/1974 | Richmond ............. | 342/110 |
| 3,882,493 A | * | 5/1975 | Bolger ............. | 342/136 |
| 4,005,420 A | * | 1/1977 | McDonald ............. | 342/84 |
| 4,014,021 A | * | 3/1977 | Fournier et al. ............. | 342/88 |
| 4,042,925 A | * | 8/1977 | Albanese et al. ............. | 342/132 |
| 4,078,234 A | * | 3/1978 | Fishbein et al. ............. | 342/110 |
| 4,142,189 A | * | 2/1979 | Gleason ............. | 342/109 |
| 4,157,545 A | * | 6/1979 | O'Farrell ............. | 342/189 |
| 4,184,154 A | * | 1/1980 | Albanese et al. ............. | 342/107 |
| 4,219,812 A | * | 8/1980 | Rittenbach ............. | 342/110 |
| 4,328,495 A | * | 5/1982 | Thue ............. | 342/109 |
| 4,513,288 A | * | 4/1985 | Weathers et al. ............. | 342/201 |
| H548 H | * | 11/1988 | Holliday et al. ............. | 342/204 |
| H767 H | * | 4/1990 | Kretschmer, Jr. et al. ... | 342/145 |
| 4,954,830 A | * | 9/1990 | Krikorian et al. ............. | 342/137 |
| 4,989,009 A | * | 1/1991 | Zerkowitz ............. | 342/145 |
| 5,023,888 A | * | 6/1991 | Bayston ............. | 375/239 |
| 5,047,780 A | * | 9/1991 | Dijkstra ............. | 342/145 |
| 5,337,052 A | * | 8/1994 | Lohrmann et al. ............. | 342/68 |
| 5,347,281 A | * | 9/1994 | Lewis et al. ............. | 342/160 |
| 5,731,782 A | * | 3/1998 | Walls ............. | 342/145 |
| 5,898,401 A | * | 4/1999 | Walls ............. | 342/82 |
| 6,211,812 B1 | * | 4/2001 | Chiles et al. ............. | 342/145 |
| 6,225,943 B1 | * | 5/2001 | Curley et al. ............. | 342/137 |
| 6,628,228 B1 | * | 9/2003 | Matich et al. ............. | 342/75 |
| 6,977,611 B1 | * | 12/2005 | Crabb ............. | 342/122 |
| 6,989,783 B1 | * | 1/2006 | Matich et al. ............. | 342/145 |

FOREIGN PATENT DOCUMENTS

GB    1 140 590    1/1969

(Continued)

*Primary Examiner*—John B. Sotomayor
(74) *Attorney, Agent, or Firm*—Crowell & Moring LLP

(57) ABSTRACT

A continuous wave ranging system, comprising a modulator 2 for modulating an r.f. carrier wave in accordance with a pseudo random code, a transmitting antenna 5 for radiating the modulated signal towards a target, a receiving antenna 6 and receiver 7 for detecting the signal reflected back from the target, a correlator 8 for correlating the reflected signal with the transmitted code with a selected phase shift corresponding to the current range gate to be tested, whereby the range of the target from the system may be determined, a store 12 containing a plurality of different pseudo random codes, and selector means 13 arranged to supply to the modulator 2 and to the correlator 8 a code from the store 12 which code does not produce a breakthrough sidelobe in at least the next range gate or gates to be tested.

6 Claims, 3 Drawing Sheets

FOREIGN PATENT DOCUMENTS

| GB | 1 246 142 | 9/1971 |
| GB | 1 504 188 | 3/1978 |
| GB | 2 202 329 | 9/1988 |
| GB | 2303509 A * | 2/1997 |
| GB | 2303754 A * | 2/1997 |
| GB | 2305323 A * | 4/1997 |

* cited by examiner

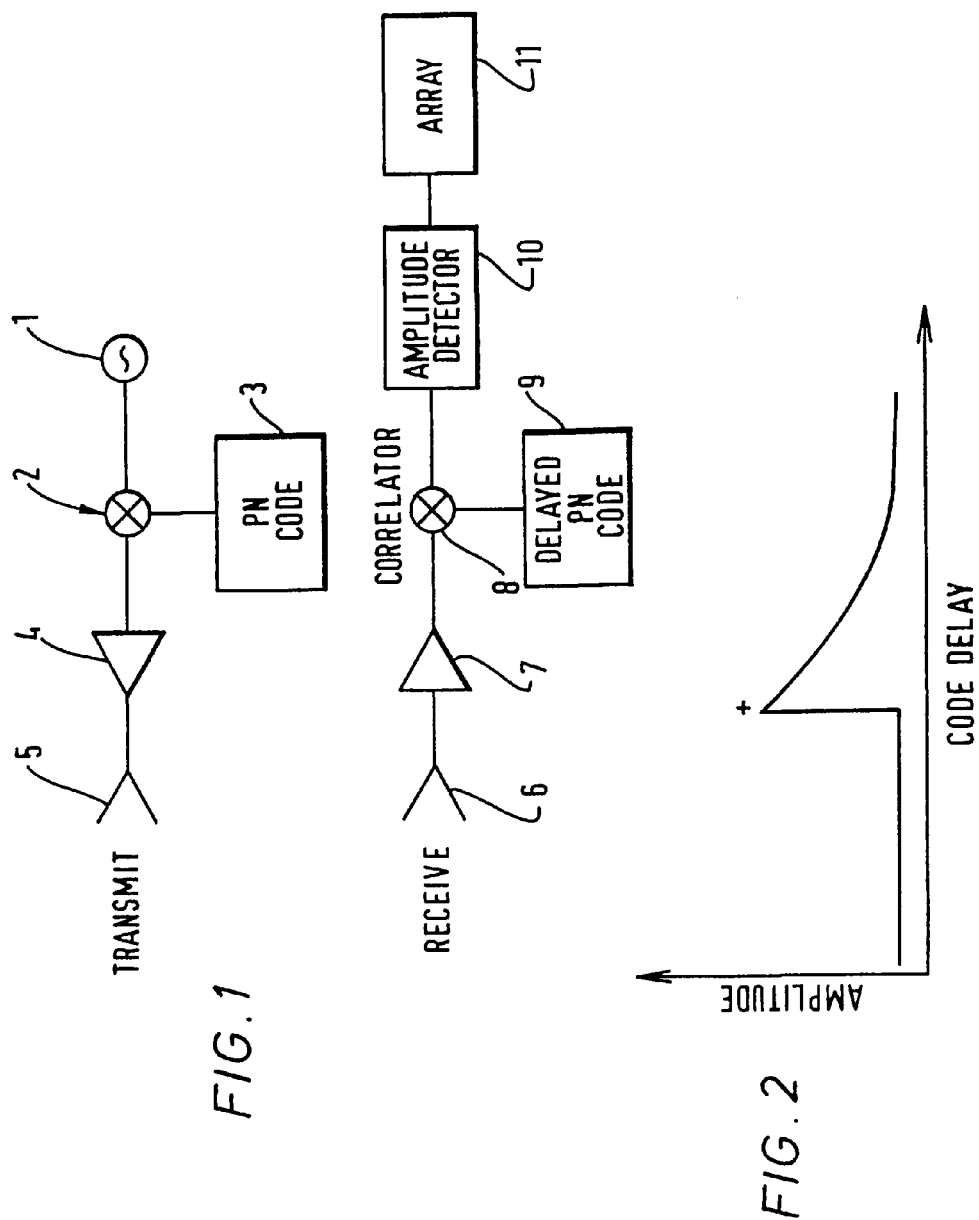

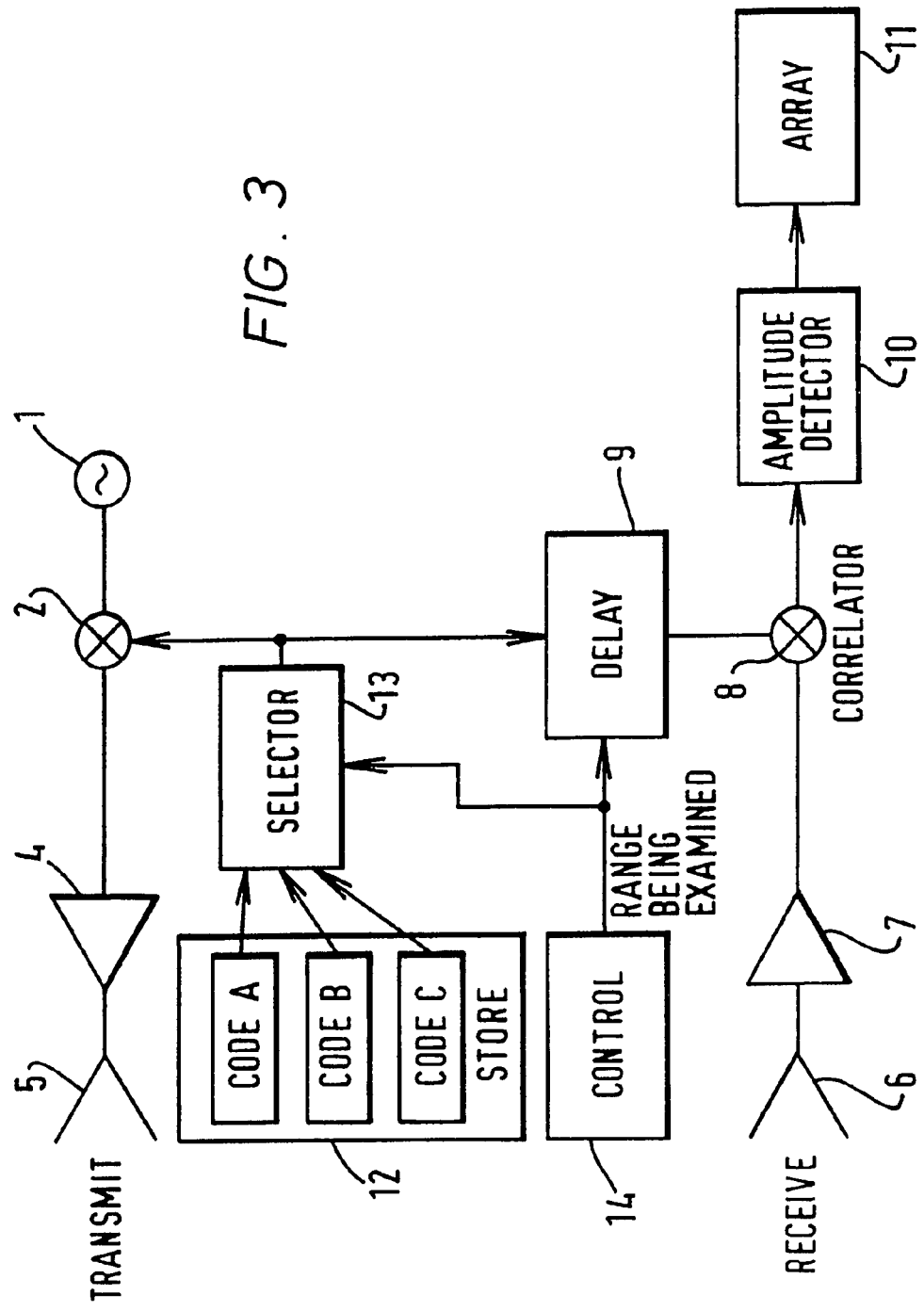

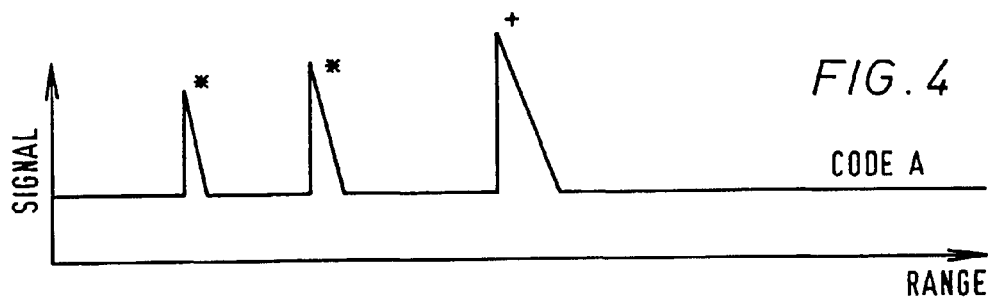
FIG. 4
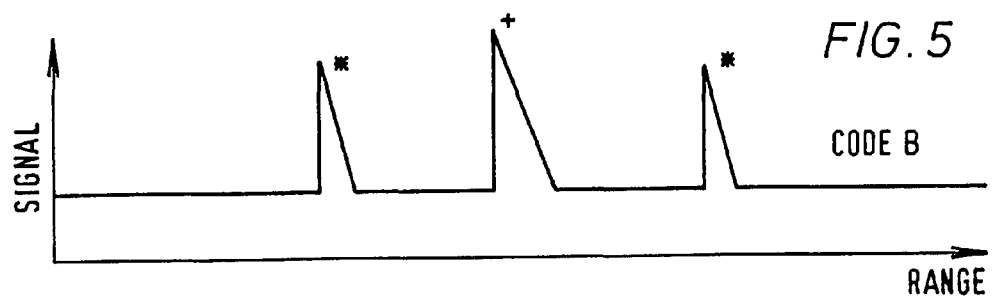
FIG. 5
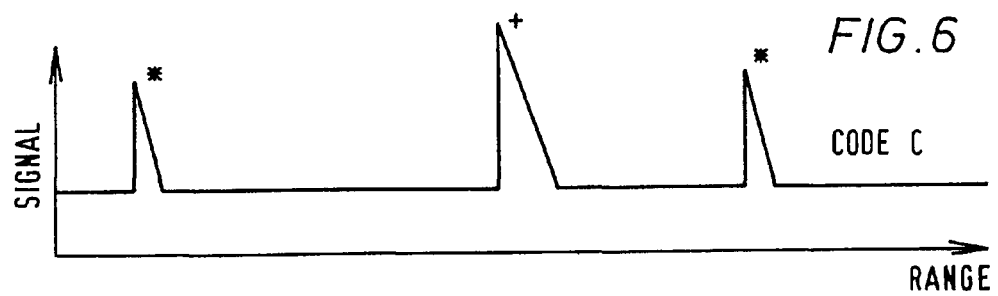
FIG. 6
FIG. 7
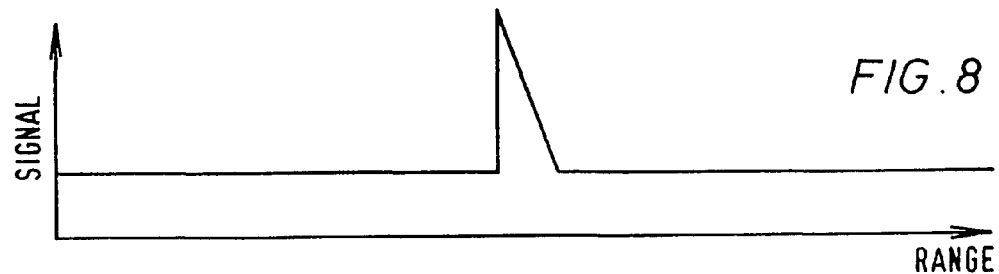
FIG. 8

RANGING SYSTEMS

BACKGROUND OF THE INVENTION

This invention relates to a continuous wave ranging system and, in one aspect, to an aircraft radar altimeter system.

Such systems usually comprise a means of microwave transmission upon which some form of coding has been added, an antenna for directing the energy to the target, an antenna for receiving the returned energy and, after amplification, a means of determining the amount of delay that has occurred on the signal, and hence the range of the target. The coding on the transmission had in the past been pulse or frequency modulation, but more recently phase modulation from a pseudo-random code has been used. This form of modulation has the property of producing a noise-like transmitted spectrum which is difficult to detect and hence finds applications where covertness is of importance. Covertness can be enchanced by reducing the transmitted power such that the returned signal is just sufficient for ranging measurement.

In such phase-modulated systems, the received signal is correlated with a delayed version of the transmitted code, the delay being gradually increased in steps, and samples of the output of the correlator are detected and stored in an array. From this stored data, the delay, and hence the range, where the received signal return occurs can be found. A typical system is shown in FIG. 1 and comprises:—a transmitter including an r.f. signal generator 1; a modulator 2 for modulating the r.f. signal in accordance with a pseudo-random code 3; a transmitter amplifier 4 and a transmitting antenna 5. The receiver includes a receiving antenna 6; a receiver amplifier 7; a correlator 8 for correlating the received signal with a delayed version of the transmitted code corresponding to the range being examined; an amplitude detector 10; and a memory array 11.

The data for such a system is shown in FIG. 2, the code delay corresponding to range.

In a direct sequence spread spectrum ranging system, correlation sidelobes can appear at any range, due either to the transmitter to receiver breakthrough or to wanted signals. These sidelobe positions can be shown to be related to the position of the signal (breakthrough or otherwise) causing the sidelobe, and the particular pseudo-random code sequence in use. By careful selection of the code sequence, it is possible to achieve a signal to sidelobe performance which allows the sidelobes of wanted signals to be disregarded. However, since the breakthrough signal is usually much greater than any wanted signal, a problem is evident when considering wanted signal to breakthrough sidelobe levels. Since the breakthrough signal position is constant, it has been found possible for any given code sequence to determine the position of the resulting breakthrough sidelobes.

SUMMARY OF THE INVENTION

Accordingly, the invention provides a continuous wave ranging system, comprising a modulator for modulating an r.f. carrier wave in accordance with a pseudo-random code, a transmitting antenna for radiating the modulated signal towards a target, a receiving antenna, an receiver for detecting the signal reflected back from the target, a correlator for correlating the reflected signal with the transmitted code with a selected phase shift corresponding to the current range gate to be tested, whereby the range of the target from the system may be determined, a store containing a plurality of different pseudo-random codes, and selector means arranged to supply to the modulator and to the correlator a code from the store, which code does not produce a breakthrough sidelobe within the next range gate or gates to be tested.

The pseudo random code used in the invention is preferably a maximal length code, e.g., a sequence of numbers generated by a shift register with certain feedbacks on it. For the system of the present invention, a code length of 2047 digits is preferred.

The present invention will be described below, by way of example, with reference to the accompanying drawings. to:

BRIEF DESCRIPTION OF THE DRAWINGS

FIG. 1 is a schematic block diagram of a known continuous wave ranging system.

FIG. 2 shows the data for the system of FIG. 1.

FIG. 3 is a schematic block diagram of a system according to one embodiment of the present invention.

FIGS. 4 to 8 illustrate, in simplified diagrammatic form, plots of signals utilised in the system of FIG. 3.

DETAILED DESCRIPTION OF THE PREFERRED EMBODIMENTS

The system shown in FIG. 3 uses the same reference numerals as in FIG. 1 for corresponding portions of the system. The system shown in FIG. 3 differs from that in FIG. 1 in respect to the correlation system utilized. In this system, the received signal is correlated with the transmitted code provided with a selected phase shift in delay 9 corresponding to the range being tested. However, the system also includes a store 12 containing a plurality of different pseudo random codes, A, B, C and a selector 13 which supplies a suitable code A, B or C from the store 12 to the modulator 2 and to the delay 9, and hence to the correlator 8. The suitable code is selected on the basis of the sidelobe characteristics to be switchable for the range being tested and the selector 12 and delay 9 are both controlled by a controller 14.

FIGS. 4, 5 and 6 show, in greatly simplified diagrammatic form, plots of signal level against examined range cell obtained by correlation for three different pseudo-random codes A, B and C respectively. The peaks marked with asterisks are the breakthrough sidelobes, while the peak marked (+) is the true signal. Since the position of the breakthrough sidelobes may be determined for any given pseudo random code in any given system, in one aspect of the invention, a range scanning algorithm is arrange to select the use of codes A, B and C to eliminate the effect of the breakthrough sidelobes. The code is changed only when necessary to minimise the effects of transients on changing code and the delay necessary to allow for the round trip time of the new code to the ground and back. In practice, the code is transmitted repeatedly, and for each sequence received, the code supplied for correlation is either maintained at the same delay for several sequences of code, to filter out the effect of any variations and thereby increase accuracy before stepping onto the next range gate, or the phase shift is incremented for each correlation.

FIG. 7 shows in simplified form the sequence of codes selected to avoid the breakthrough sidelobes appearing in the diagrams of FIGS. 4, 5 and 6. Selection of code B avoids the first sidelobes appearing in FIGS. 4 and 6, while changing them to code C avoids the second sidelobe in FIG. 4 and the first sidelobe in FIG. 5. Finally, changing to code A avoids the final sidelobes in FIGS. 5 and 6. The resultant response in idealised diagrammatic form is shown in FIG. 7.

The code maps themselves are easily implemented by the use of arrays of Boolean variables indexed by range. Each Boolean entry need only signify the suitability of a particular code for operation in the indexed range. In order to minimise the storage requirements for the resultant code maps, it is desirable that each array element in the map should cover a significant proporation of the entire range, for example 1/20th. Thus each map need only contain 20 values.

In order to minimise the number of code changes made, the scanning algorithm will sometimes need to look ahead when faced with a choice of two or more suitable codes. This look ahead will need to take into account the required scanning order, but if an increasing range scanner is used, then the operation merely involves looking forward through the maps of each suitable code and choosing the one which remains suitable for the longest range. Should two or more codes satisfy this requirement, then the choice is unimportant.

The invention claimed is:

1. A continuous wave ranging system, comprising: an r.f. generator for generating an r.f. carrier wave, a modulator for modulating said r.f. carrier wave in accordance with a pseudo random code, a transmitting antenna for radiating a modulated signal from said modulator towards a target, a receiving antenna and receiver for detecting a signal reflected back from said target, a correlator for correlating said signal reflected back from the target with said pseudo random code which incorporates a selected phase shift corresponding to a current range gate to be tested, whereby the range of the target from the system may be determined, a store containing a plurality of different pseudo random codes, and selector means arranged to supply to the modulator and to the correlator a code selected from said store, which selected code does not provide a breakthrough sidelobe within a next range gate to be tested.

2. A system as claimed in claim 1, wherein said selector means selects the codes from the store and uses them in a sequence which substantially eliminates the effect of breakthrough sidelobes.

3. A system as defined in claim 2, wherein said selector means selects codes from said store, which selected codes do not produce breakthrough side lobes in future range gates to be tested.

4. A system as defined in claim 3, wherein said selector means selects codes from the plurality of codes to reduce the number of code changes required when scanning different ranges.

5. A system as claimed in claim 3, wherein: said system is operative to sequentially scan increasing ranges; and said selector means selects codes which do not produce breakthrough side lobes within the longest range gate.

6. A method of operating a continuous wave ranging system which comprises an r.f. generator for generating an r.f. carrier wave, a modulator for modulating said r.f. carrier wave in accordance with a pseudo random code, a transmitting antenna for radiating a modulated signal from said modulator towards a target, a receiving antenna and receiver for detecting a signal reflected back from said target, a correlator for correlating said signal reflected back from the target with said pseudo random code which incorporates a selected phase shift corresponding to a current range gate to be tested, whereby the range of the target from the system may be determined, a store containing a plurality of different pseudo random codes, and selector means arranged to supply to the modulator and to the correlator a code selected from said plurality of different pseudo random codes in said store; the method comprising the steps of: for each stored code, ascertaining and providing an indication of, the range gates within which the respective stored code will produce a breakthrough side lobe; and during ranging use of the system, causing the selector means to select from the store only a code which does not produce a breakthrough side lobe within a next range gate to be tested.

* * * * *